(12) United States Patent
Kwak

(10) Patent No.: US 12,711,625 B2
(45) Date of Patent: Aug. 18, 2026

(54) APPARATUS FOR LESION DIAGNOSIS AND METHOD THEREOF

(71) Applicant: UNIVERSITY-INDUSTRY COOPERATION GROUP OF KYUNG HEE UNIVERSITY, Yongin-si (KR)

(72) Inventor: Min Seob Kwak, Seoul (KR)

(73) Assignee: UNIVERSITY-INDUSTRY COOPERATION GROUP OF KYUNG UNIVERSITY, Yongin-si (KR)

( * ) Notice: Subject to any disclaimer, the term of this patent is extended or adjusted under 35 U.S.C. 154(b) by 271 days.

(21) Appl. No.: 18/575,402

(22) PCT Filed: Dec. 13, 2021

(86) PCT No.: PCT/KR2021/018826
§ 371 (c)(1),
(2) Date: Dec. 29, 2023

(87) PCT Pub. No.: WO2023/286948
PCT Pub. Date: Jan. 19, 2023

(65) Prior Publication Data

US 2024/0312015 A1 Sep. 19, 2024

(30) Foreign Application Priority Data

Jul. 13, 2021 (KR) ........................ 10-2021-0091467

(51) Int. Cl.
*G06T 7/00* (2017.01)
*G06T 7/11* (2017.01)
(Continued)

(52) U.S. Cl.
CPC .............. *G06T 7/0014* (2013.01); *G06T 7/11* (2017.01); *G06T 7/136* (2017.01); *G06T 7/155* (2017.01);
(Continued)

(58) Field of Classification Search
None
See application file for complete search history.

(56) References Cited

U.S. PATENT DOCUMENTS

2015/0164478 A1* 6/2015 Jung .................. G01S 7/52063 600/443
2015/0265162 A1* 9/2015 Lavi ...................... A61B 6/504 600/408

(Continued)

FOREIGN PATENT DOCUMENTS

KR 10-2013-0049638 A 5/2013
KR 10-2015-0054605 A 5/2015

(Continued)

OTHER PUBLICATIONS

International Search Report for PCT/KR2021/018826 dated Apr. 8, 2022 (PCT/ISA/210).

*Primary Examiner* — Leon Flores
(74) *Attorney, Agent, or Firm* — Sughrue Mion, PLLC

(57) ABSTRACT

An apparatus for lesion diagnosis and a method thereof are provided. The apparatus according to some example embodiments may perform acquiring a medical image of a subject, extracting a blood vessel region from the acquired medical image, measuring a distance between blood vessel bifurcation points in the extracted blood vessel region, and predicting a size of a lesion with respect to the measured distance. By doing this, the size of the lesion may be accurately predicted without intervention of human.

12 Claims, 12 Drawing Sheets

(51) Int. Cl.
*G06T 7/136* (2017.01)
*G06T 7/155* (2017.01)
*G06T 7/60* (2017.01)

(52) U.S. Cl.
CPC ...... *G06T 7/60* (2013.01); *G06T 2207/20081* (2013.01); *G06T 2207/20084* (2013.01); *G06T 2207/30028* (2013.01); *G06T 2207/30096* (2013.01); *G06T 2207/30101* (2013.01)

(56) References Cited

U.S. PATENT DOCUMENTS

| | | | | |
|---|---|---|---|---|
| 2019/0080454 | A1* | 3/2019 | Hameed | A61B 1/00177 |
| 2019/0231291 | A1* | 8/2019 | Otake | A61B 6/032 |
| 2020/0311932 | A1* | 10/2020 | Hooper | G06F 18/2413 |
| 2020/0364570 | A1* | 11/2020 | Kitamura | G06F 18/2431 |

FOREIGN PATENT DOCUMENTS

| | | | |
|---|---|---|---|
| KR | 10-2020-0061874 | A | 6/2020 |
| KR | 10-2020-0062764 | A | 6/2020 |
| KR | 10-2021-0001233 | A | 1/2021 |

* cited by examiner

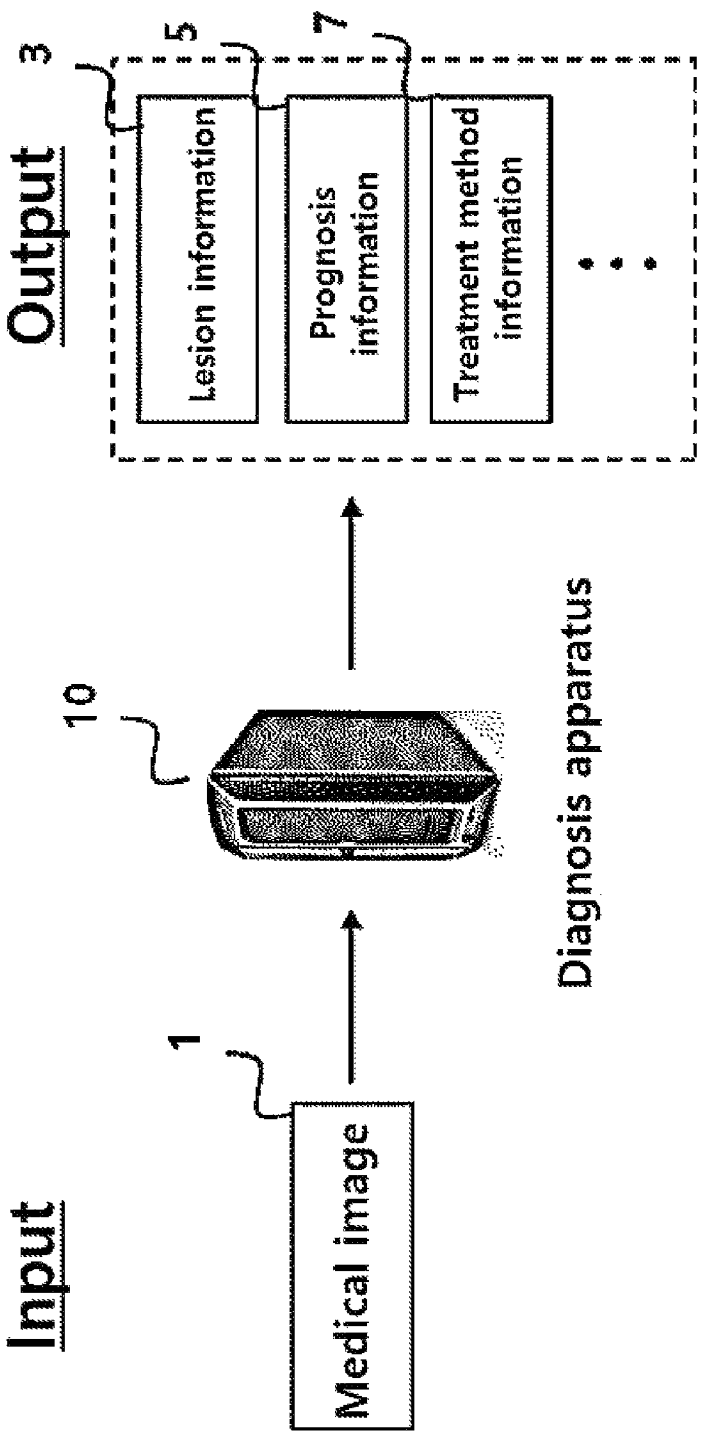
【FIG. 1】

【FIG. 2】
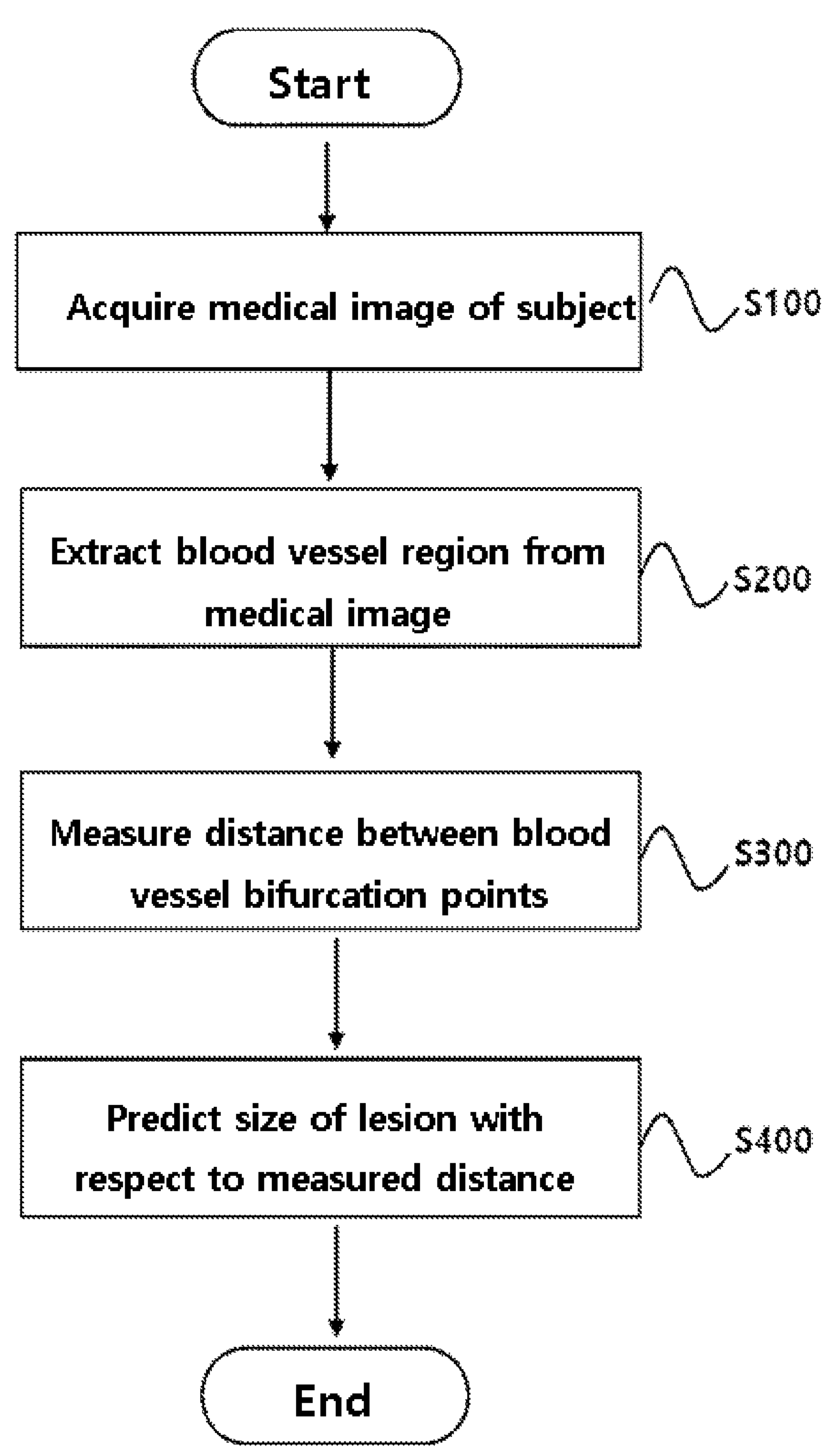

【FIG. 3】
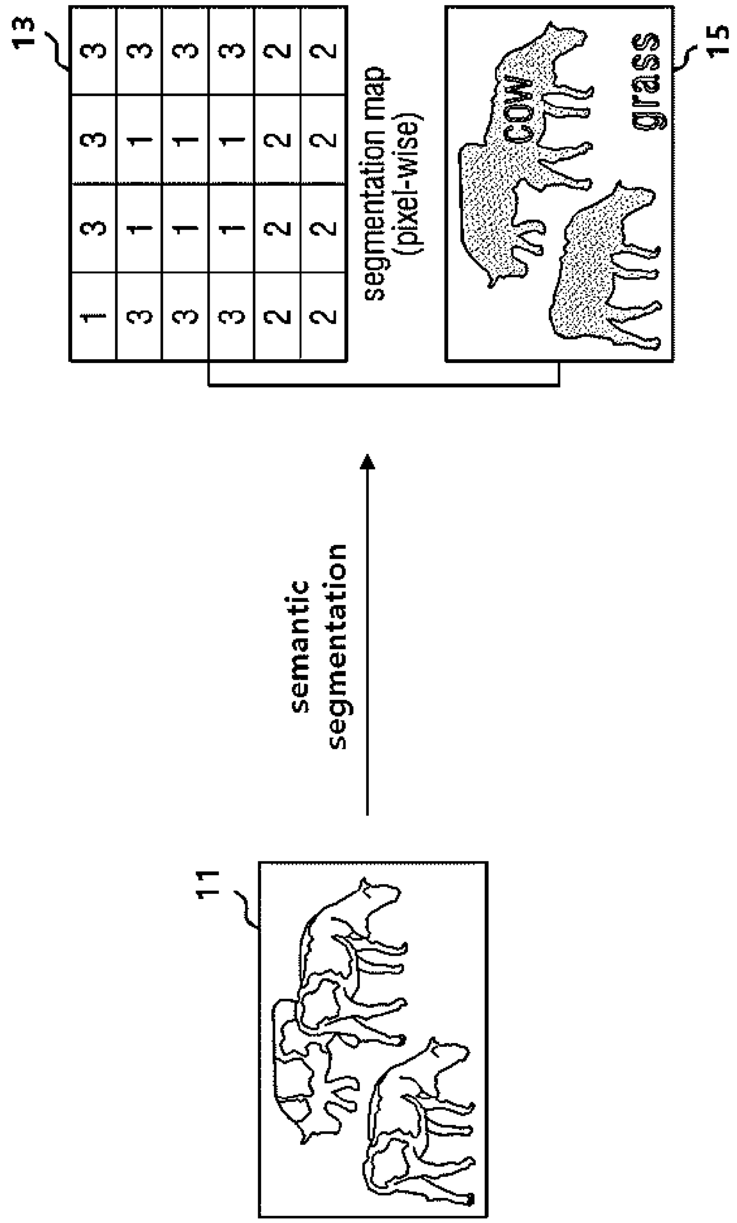
| 1 | 3 | 3 | 3 |
|---|---|---|---|
| 3 | 1 | 1 | 3 |
| 3 | 1 | 1 | 3 |
| 3 | 1 | 1 | 3 |
| 2 | 2 | 2 | 2 |
| 2 | 2 | 2 | 2 |

[FIG. 4]
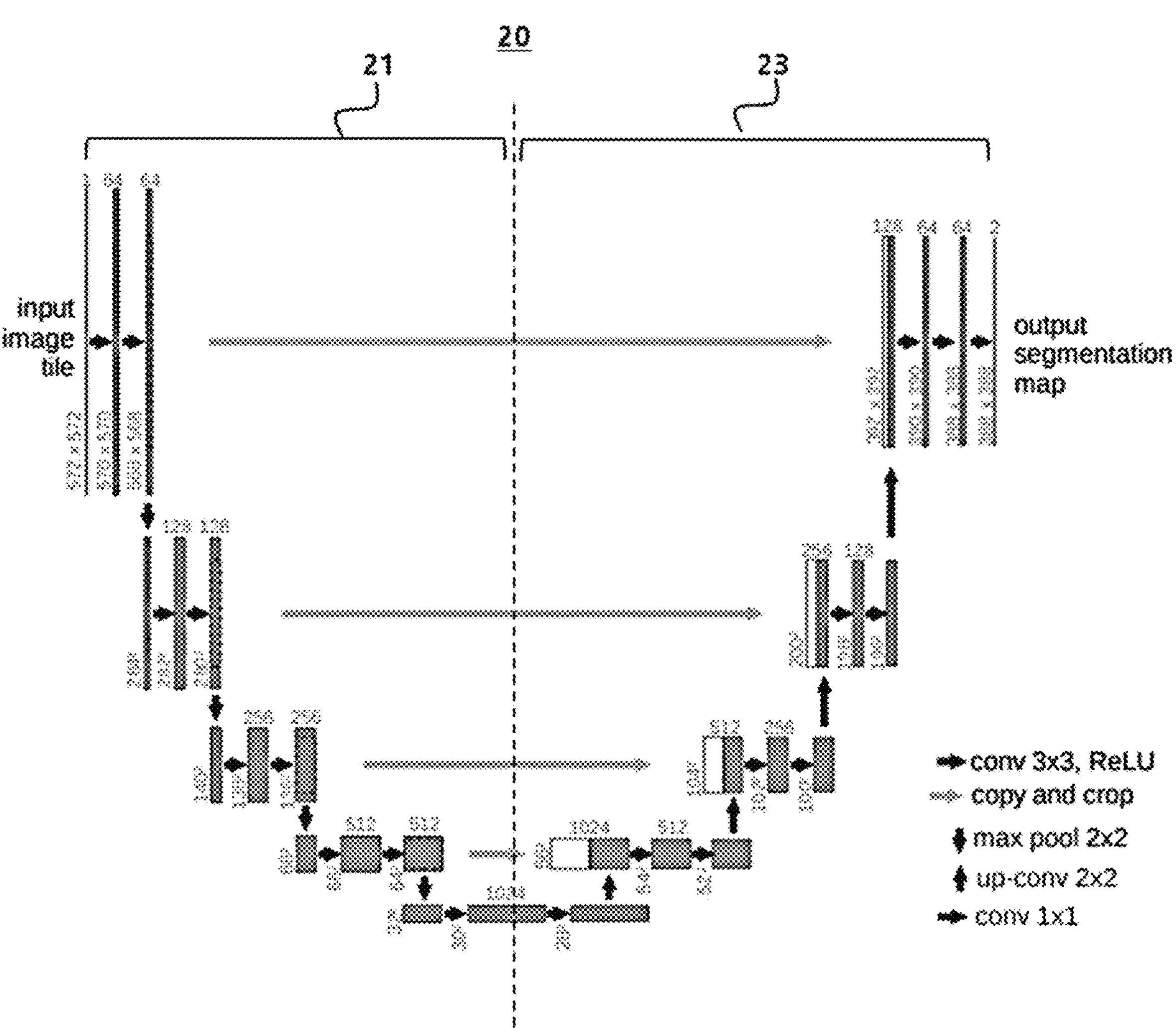

[FIG. 5]
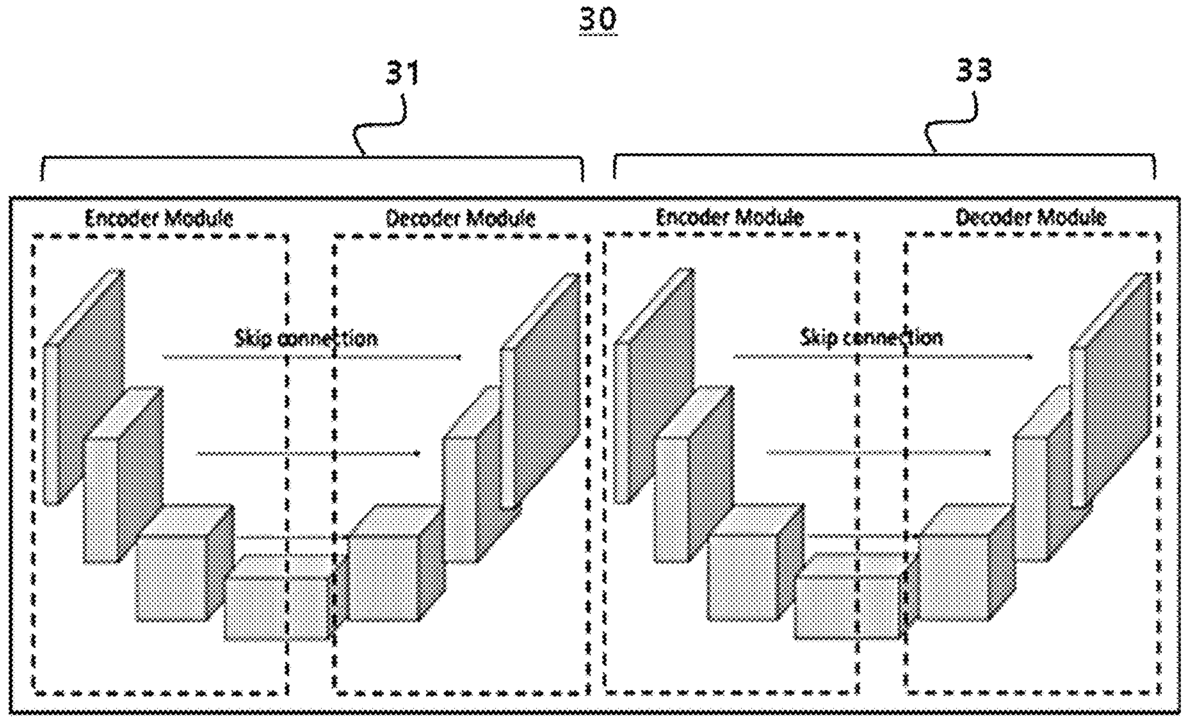

[FIG. 6]
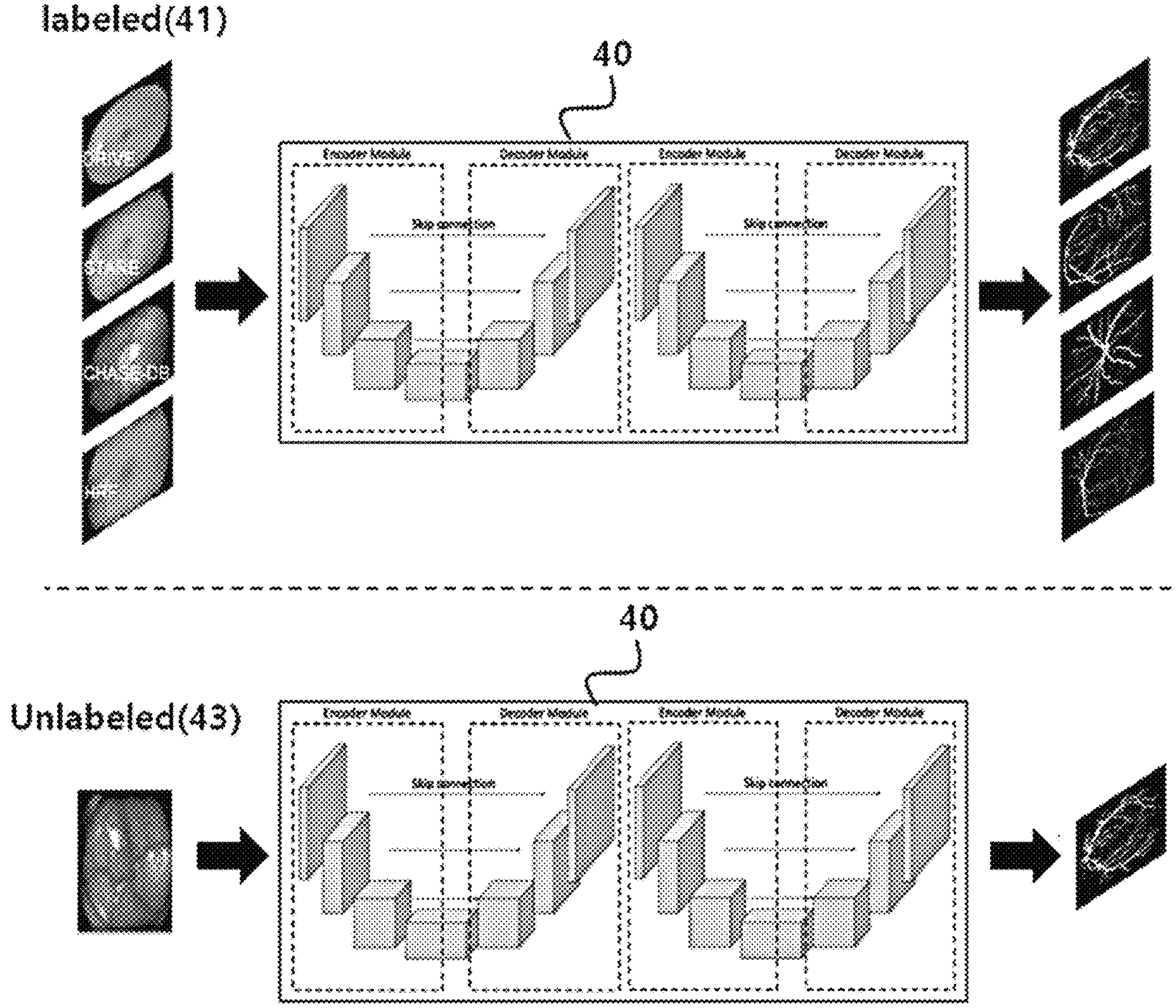

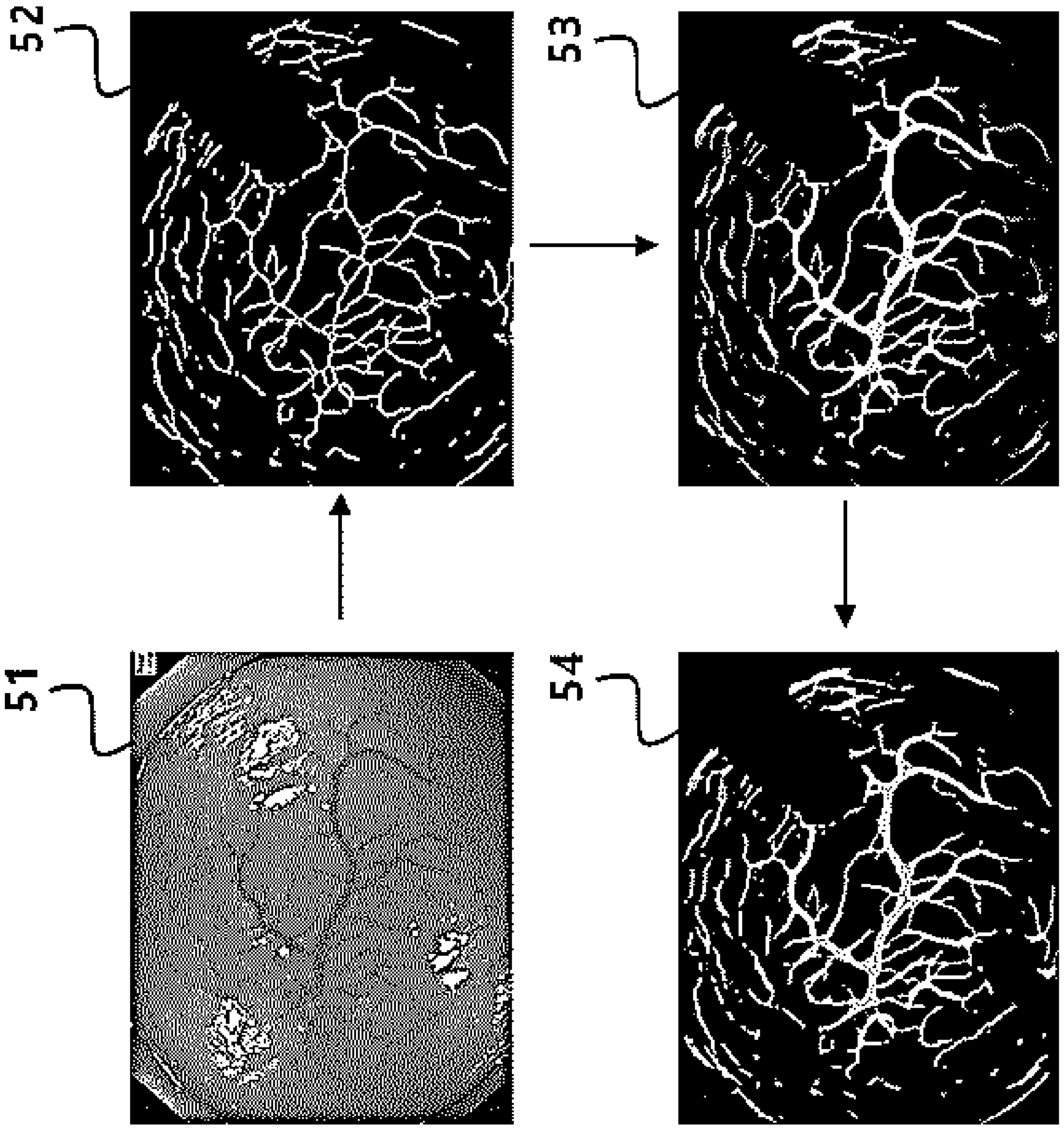
【FIG. 7】

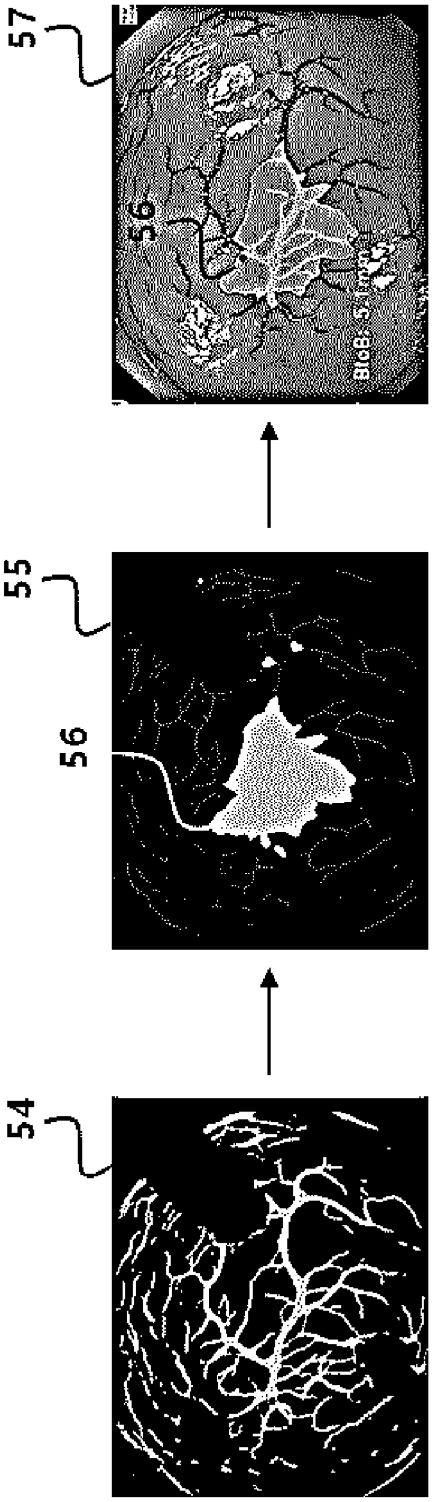
【FIG. 8】

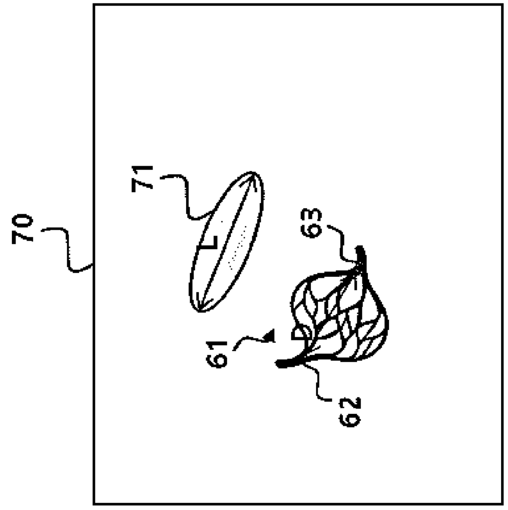
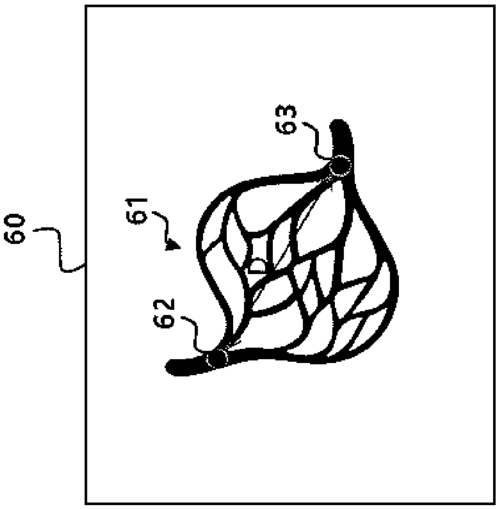
【FIG. 9】

[FIG. 10]
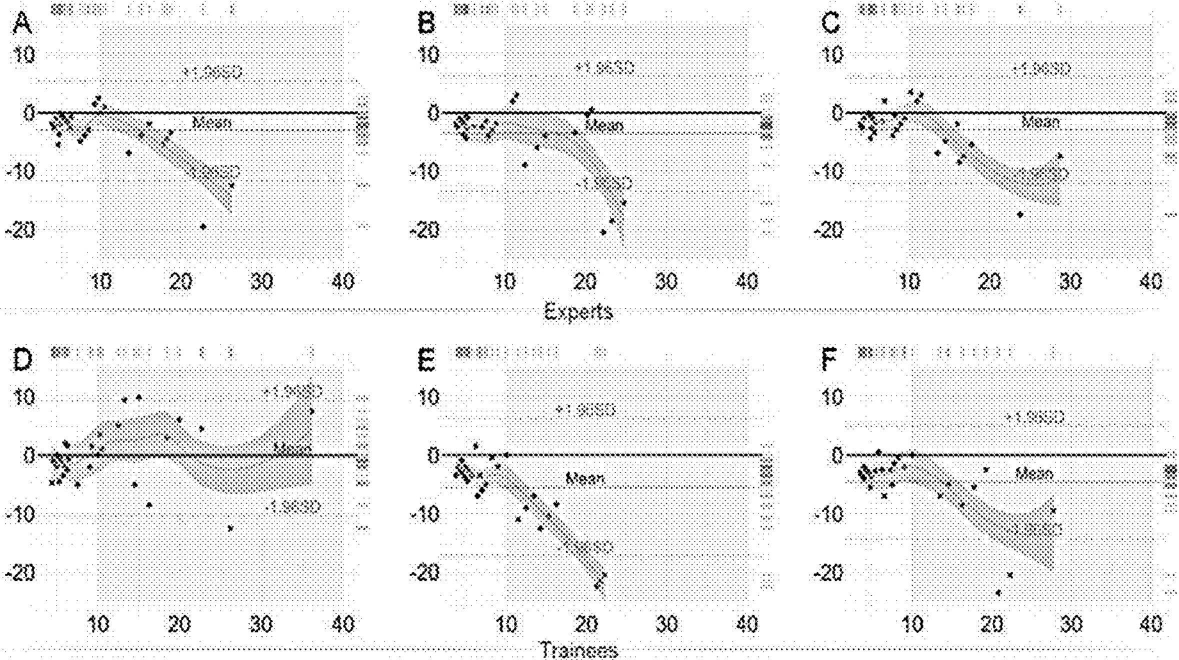

[FIG. 11]

A
+1.96SD
Mean
-1.96SD
Expert

B
+1.96SD
Mean
-1.96SD
Trainee

C
+1.96SD
Mean
-1.96SD
BtoB

【FIG. 12】
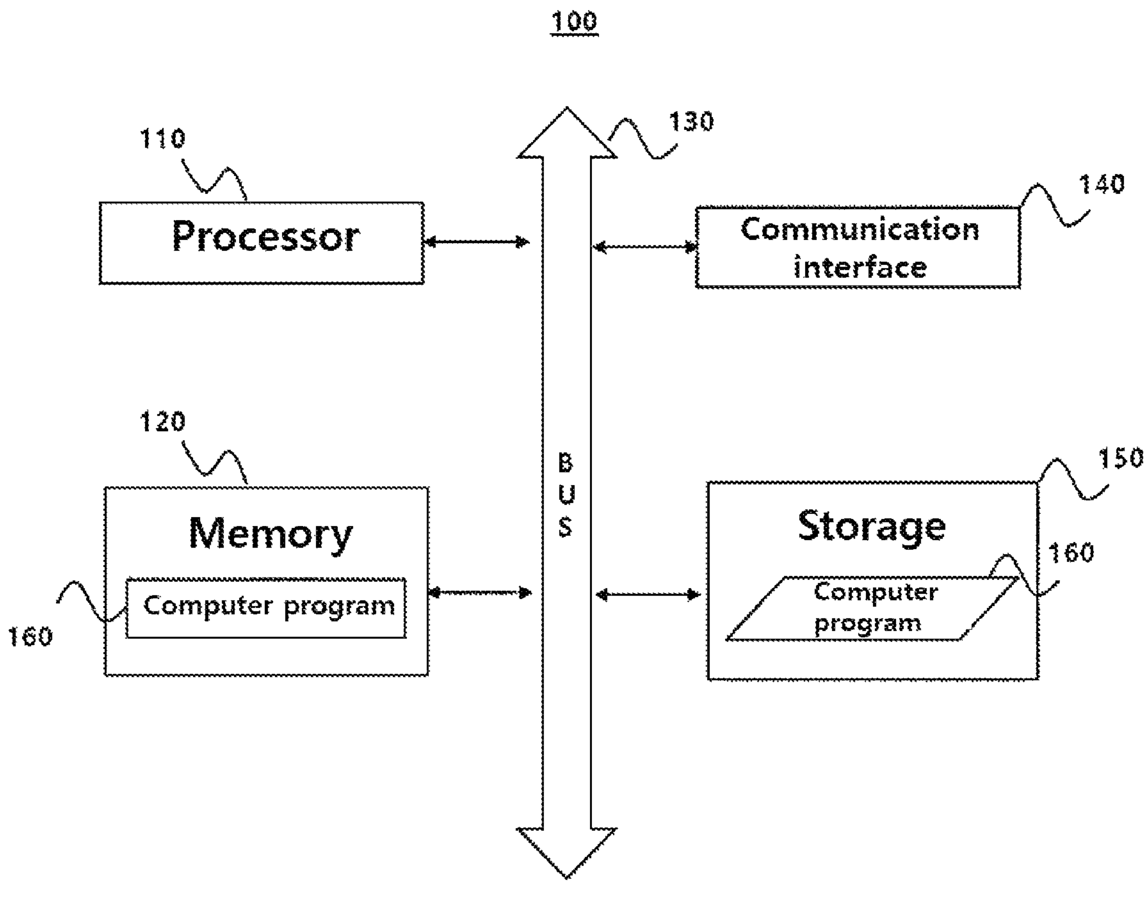

APPARATUS FOR LESION DIAGNOSIS AND METHOD THEREOF

CROSS REFERENCE TO RELATED APPLICATIONS

This application is a National Stage of International Application No. PCT/KR2021/018826 filed Dec. 13, 2021, claiming priority based on Korean Patent Application No. 10-2021-0091467 filed Jul. 13, 2021, the entire disclosures of which are incorporated herein by reference.

TECHNICAL FIELD

The present disclosure relates to an apparatus for lesion diagnosis and a method thereof, and more particularly, to an apparatus for diagnosing a lesion state, such as a size of a lesion, from a medical image of a subject and a method which is performed in the apparatus.

BACKGROUND ART

Polyps, one of benign tumors, are the most common lesions frequently generated in the large intestine and may be discovered by colonoscopy. Among various state information about the polyp, a size of the polyp is important information used to determine an examination cycle of the subject and predict the prognosis of the subject. Accordingly, it is very important to accurately measure the size of the polyp.

Generally, the size of the polyp is directly measured by experts. For example, the expert may measure (predict) the size of polyps by visually identifying colonoscopy images or using biopsy forceps.

However, the above-mentioned methods have problems in that measurement results vary depending on subjectivity (experience) of the expert and a degree of distortion of the colonoscopy images so that the accuracy and the reliability of the measurement results are not high.

DISCLOSURE

Technical Problem

Technical objects to be achieved by some example embodiments of the present disclosure are to provide an apparatus which accurately diagnoses a lesion state, such as a size of the lesion, from the medical image of the subject and a method performed by the apparatus.

Technical objects of the present disclosure are not limited to the aforementioned technical objects and other technical objects which are not mentioned will be apparently appreciated by those skilled in the art from the following description.

Technical Solution

In order to achieve the above-described technical objects, according to some example embodiments of the present disclosure, an apparatus for lesion diagnosis may include a processor; and a memory configured to store one or more instructions, wherein the processor configured to, by executing the one or more stored instructions, perform: acquiring a medical image of a subject; extracting a blood vessel region from the acquired medical image; measuring a distance between blood vessel bifurcation points in the extracted blood vessel region; and predicting a size of a lesion based on the measured distance.

In some example embodiments, the extracting a blood vessel region may include extracting the blood vessel region using a deep learning model configured to perform semantic segmentation.

In some example embodiments, the extracted blood vessel region may be a blood vessel region located inside the lesion or to be adjacent to the lesion.

In some example embodiments, the measuring a distance between the blood vessel bifurcation points may include: detecting a dense region from the extracted blood vessel region based on a density of the blood vessel; and measuring the distance between the blood vessel bifurcation points located in the dense region.

In some example embodiments, the medical image may include a first image including the blood vessel region and a second image including both the blood vessel region and the lesion region, the extracting a blood vessel region may include: extracting the blood vessel region from the first image, and the predicting a size of the lesion may include: predicting the size of the lesion based on a relative size of a region including the blood vessel bifurcation point and the lesion region on the second image.

In some example embodiments, the medical image may be a colonoscopy image, and the lesion may be a polyp.

In order to achieve the above-described technical object, according to some example embodiments of the present disclosure, a method for lesion diagnosis, performed by a computing device, may include: acquiring a medical image of a subject; extracting a blood vessel region from the acquired medical image; measuring a distance between blood vessel bifurcation points in the extracted blood vessel region, and predicting a size of the lesion based on the measured distance.

In order to achieve the above-described technical object, a computer program according to some example embodiments of the present disclosure may be recorded in a computer readable recording medium which is coupled to a computing device to perform: acquiring a medical image of a subject; extracting a blood vessel region from the acquired medical image; measuring a distance between blood vessel bifurcation points in the extracted blood vessel region, and predicting a size of the lesion based on the measured distance.

Advantageous Effects

According to some example embodiments of the present disclosure described above, a size of the lesion may be automatically predicted from the medical image of the subject without intervention of human. Accordingly, objective and highly reliable lesion information may be provided. For example, the size of the polyp is automatically predicted from the colonoscopy image to provide objective and highly reliable polyp information.

Further, the size of the lesion is predicted based on the bifurcation distance of the blood vessel to improve a prediction accuracy of the lesion size.

Furthermore, a deep learning model which performs semantic segmentation is used to accurately extract a blood vessel region. Accordingly, a prediction accuracy for the lesion size may be further improved.

Furthermore, a distance between blood vessel bifurcation points in a blood vessel region located close to the lesion is measured to more accurately predict the size of the lesion.

Furthermore, a distance between blood vessel bifurcation points in a medical image with a less distortion is measured to more accurately predict the size of the lesion.

The effects according to the technical spirit of the present disclosure are not limited to the above-mentioned technical effects, and other effects which are not mentioned may be clearly understood by those skilled in the art from the following description.

DESCRIPTION OF DRAWINGS

FIG. 1 is an example view for explaining a lesion diagnosis apparatus according to some example embodiments of the present disclosure and input/output data thereof.

FIG. 2 is an example flowchart schematically illustrating a lesion diagnosis method according to some example embodiments of the present disclosure.

FIG. 3 is an example view for explaining a concept of semantic segmentation which is referenced in some example embodiments of the present disclosure.

FIGS. 4 and 5 are example views for explaining a structure of a deep learning model according to some example embodiments of the present disclosure.

FIG. 6 is an example view for explaining a training method of a deep learning model according to some example embodiments of the present disclosure.

FIG. 7 is an example view illustrating a process of performing image processing on a blood vessel region image, according to some example embodiments of the present disclosure.

FIG. 8 is an example view for explaining a method of measuring a distance between blood vessel bifurcation points according to some example embodiments of the present disclosure.

FIG. 9 is an example view for explaining a lesion diagnosis method considering image distortion, according to some example embodiments of the present disclosure.

FIGS. 10 and 11 illustrate a comparison experiment result for lesion size prediction.

FIG. 12 is an example computing device which implements a lesion diagnosis apparatus according to some example embodiments of the present disclosure.

MODES OF THE INVENTION

Hereinafter, preferred example embodiments of the present disclosure will be described in detail with reference to the accompanying drawings. Advantages and characteristics of the present disclosure, and a method of achieving the advantages and characteristics will be clear by referring to example embodiments described below in detail together with the accompanying drawings. However, the technical spirit of the present disclosure is not limited to example embodiments disclosed herein but will be implemented in various different forms. The following example embodiments are provided solely to complete the technical spirit of the present disclosure and fully inform those skilled in the art of the scope of the present disclosures. Therefore, the technical spirit of the present disclosure will be defined only by the scope of the claims.

When reference numerals denote components in the drawings, even though the like parts are illustrated in different drawings, it should be understood that like reference numerals refer to the same parts. Furthermore, when it is judged that a specific description on known configurations or functions related in the description of the present disclosure may unnecessarily obscure the essentials of the present disclosure, the detailed description will be omitted.

Unless otherwise defined, all terms (including technical and scientific terms) used in the present specification may be used as the meaning which may be commonly understood by the person with ordinary skill in the art, to which the present disclosure belongs. It will be further understood that terms defined in commonly used dictionaries should not be interpreted in an idealized or excessive sense unless expressly and specifically defined. The terms used in the present specification are for explaining the example embodiments rather than limiting the present disclosure. Unless particularly stated otherwise in the present specification, a singular form also includes a plural form.

Further, in describing components of the present disclosure, terminologies such as first, second, A, B, (a), (b), and the like may be used. However, such terminologies are used only to distinguish a component from another component, but nature, a sequence or an order of the component is not limited by the terminologies. If it is described that a component is "connected" or "coupled" to the other component, it is understood that the component is directly connected or coupled to the other component, but another component may be "connected" or "coupled" between the components.

The word "comprises" and/or "comprising" used in the present disclosure will be understood to imply the inclusion of stated constituents, steps, operations and/or elements but not the exclusion of any other constituents, steps, operations and/or elements.

[Modes for Carrying Out the Disclosure]

Hereinafter, various example embodiments of the present disclosure will be described in detail with reference to the accompanying drawings.

FIG. 1 is an example view for explaining a lesion diagnosis apparatus 10 according to some example embodiments of the present disclosure and input/output data thereof.

As illustrated in FIG. 1, the lesion diagnosis apparatus 10 may be a computing device which receives and analyzes a medical image 1 of a subject to output (provide) various diagnosis information (for example, 3, 5, and 7). For example, the lesion diagnosis apparatus 10 may receive the colonoscopy image of the subject, detect polyps from the colonoscopy image, and provide state information such as a size (for example, a length, a thickness, an area, and the like), a location, and a shape of the polyp. Further, the lesion diagnosis apparatus 10 may predict and provide a prognosis of the subject based on the size information of the polyp, and the like and also provide information about a treatment method. As a more specific example, when a size of the polyp is equal to or larger than a reference value, the lesion diagnosis apparatus 10 may provide prognosis information indicating a high possibility of colon cancer and provide information about a treatment method (for example, resection surgery, dietary habit information, lifestyle rule information, and the like), endoscopic examination cycles, and the like. Hereinafter, for the convenience of description, the lesion diagnosis apparatus 10 is simply referred to as a "diagnosis apparatus 10".

The computing device may be, for example, a notebook, a desktop, a laptop, and the like, but is not limited thereto and may include any type of device including a computing function. Refer to FIG. 12 for an example of the computing device.

The medical image 1 is an image obtained by capturing a tissue (organ) in which a lesion may be generated and for example, may be a colonoscopy image captured by an endoscope camera. However, it is not limited thereto.

The lesion information 3 may include information about presence, a size, a location, a shape, and the like of a lesion, but it is not limited thereto. There are various types of lesions, and the type of lesion may vary depending on an organ (tissue) to be examined. When the organ (tissue) to be examined is a large intestine, the lesion may be a polyp, for example, but it is not limited thereto.

The prognosis information 5 may include information such as the possibility of recurrence (occurrence) of the disease, the possibility of survival, the progressive stage of disease, or the progressive state of disease. However, it is not limited thereto. Details of the prognosis information 5 may vary depending on the target disease. For example, when the target disease is the colorectal cancer, the prognosis information 5 may include information about recurrence (occurrence) possibility of colorectal cancer.

The treatment method information 7 may include information about an appropriate treatment method according to prognosis, desirable lifestyle rules, eating habits, and the like, but it is not limited thereto.

According to various example embodiments of the present disclosure, the diagnosis apparatus 10 may extract a blood vessel region from the medical image 1 and accurately predict a size of the lesion based on a distance between blood vessel bifurcation points located in the extracted blood vessel region (hereinafter, the distance may be abbreviated as a "bifurcation distance"). For example, the diagnosis apparatus 10 may measure a distance between the blood vessel bifurcation points in the colonoscopy image and accurately predict a size of the polyp based on the measured distance. This example embodiments will be described in detail with reference to FIG. 2 below.

In the meantime, FIG. 1 illustrates that the diagnosis apparatus 10 is implemented by one computing device as an example, but the diagnosis apparatus 10 may be implemented by a plurality of computing devices. For example, a first function of the diagnosis apparatus 10 may be implemented in a first computing device and a second function may be implemented in a second computing device. Alternatively, a specific function of the diagnosis apparatus 10 may be implemented in a plurality of computing devices.

Until now, the diagnosis apparatus 10 according to some example embodiments of the present disclosure has been described with reference to FIG. 1. Hereinafter, a lesion diagnosis method which may be performed in the diagnosis apparatus 10 illustrated in FIG. 1 will be described. However, for the convenience of understanding, unless otherwise mentioned, the description will be continued by assuming that the medical image is a "colonoscopy image" and a type of lesion is a "polyp".

Each step of a lesion diagnosis method to be described below may be implemented by one or more instructions which may be executed by a processor of the computing device. When a subject of a specific step (operation) is omitted, it is understood as being performed by the diagnosis apparatus 10. However, in some cases, some steps of the lesion diagnosis method may be performed by another computing device.

FIG. 2 is an example flowchart schematically illustrating a lesion diagnosis method according to some example embodiments of the present disclosure. However, this is just an example embodiment to achieve an object of the present disclosure and if necessary, some steps may be added or deleted.

As illustrated in FIG. 2, the lesion diagnosis method may start from a step S100 of acquiring a medical image of a subject. For example, the diagnosis apparatus 10 may acquire a colonoscopy image of the subject. The colonoscopy image may include one or more images captured by an endoscopy camera.

In step S200, a blood vessel region may be extracted from the medical image. For example, the diagnosis apparatus 10 may extract a blood vessel region from the colonoscopy image. At this time, the extracted blood vessel region may be inside of the lesion or a blood vessel region located adjacent to the lesion. Alternatively, the medical image may be an image obtained by capturing a blood vessel located inside of the lesion or adjacent to the lesion. When the blood vessel is located to be close to the lesion, even though the image is distorted, the blood vessel region and the lesion region are distorted at a similar level so that the size of the lesion may be accurately predicted with respect to the bifurcation distance.

In step S200, a specific method for extracting a blood vessel region may vary depending on the example embodiment.

In some example embodiments, a blood vessel region may be extracted by an image processing technique. For example, the diagnosis apparatus 10 may extract a blood vessel region by means of an edge detection technique, but it is not limited thereto.

In some example embodiments, a blood vessel region may be extracted by a deep learning model which performs (is configured to perform) semantic segmentation. For example, the diagnosis apparatus 10 may segment the blood vessel region from the colonoscopy image using a trained deep learning model. In this case, the extraction accuracy of the blood vessel region may be improved by precisely extracting the blood vessel region to a pixel level by means of a highly trained deep learning model. The present example embodiments will be described in more detail below.

Further, in some example embodiments, the blood vessel region may be extracted based on a combination of the above-described example embodiments. For example, the diagnosis apparatus 10 may extract a first blood vessel region by means of the deep learning model and extract a second blood vessel region by means of an image processing technique and determine a final blood vessel region by synthesizing the first blood vessel region and the second blood vessel region (for example, an intersection area or a union area is determined as a final blood vessel region).

Hereinafter, for the convenience of understanding, example embodiments of the semantic segmentation will be additionally described with reference to FIGS. 3 to 6.

First, FIG. 3 is an example view for explaining a concept of semantic segmentation.

As illustrated in FIG. 3, the semantic segmentation may refer to a task which predicts a class in a pixel level, rather than in an image level. For example, when the semantic segmentation is performed on the given image 11, a segmentation map 13 or a segmentation result image 15 which is a pixel-wise class prediction result may be obtained. The segmentation result image 15 may refer to an image which represents the segmentation map 13 but is not limited thereto. The semantic segmentation is a task which performs dense prediction in the pixel level so that it is referred to with a term "dense prediction" in the technical field.

The semantic segmentation is a task which is the most essential and has a high difficulty level, among various tasks in a computer vision field and may be performed by a deep learning model to achieve a high accuracy. However, a detailed structure of the deep learning model will be designed in various forms.

For example, the deep learning model may be configured by an encoder and a decoder corresponding thereto. Here, the encoder may be implemented by a neural network which performs a down-sampling process on an input image and the decoder may be implemented by a neural network which performs an up-sampling process on a feature map extracted from the down-sampling process. In other words, the encoder may be implemented by a neural network which extracts a feature map by means of convolution and pooling operations and the decoder may be implemented by a neural network which performs an up-convolution (or deconvolution) operation on the feature map extracted from the encoder, but it is not limited thereto.

As another example, as illustrated in FIG. 4, the deep learning model 20 may be configured by the encoder 21 and the decoder 23 and conceptually formed with a U-shaped structure. Here, the encoder 21 may perform the down-sampling process on the input image. The decoder 23 may perform the up-sampling process on the feature map extracted by the down-sampling process. The example deep learning model 20 utilizes both a feature map extracted by the encoder 21 and a feature map generated by the decoder 23 (for example, a feature map generated in a previous up-sampling step and a feature map extracted in a corresponding down-sampling step are concatenated to be input in the current up-sampling step: copy and crop, see the arrow), to ensure a high segmentation accuracy. The deep learning model 20 illustrated in FIG. 4 will be described in more detail further with reference to known technical data regarding "U-Net." For reference, the U-Net is known to show a high segmentation accuracy for a medical image.

As still another example, as illustrated in FIG. 5, the deep learning model 30 may be configured by a W-shaped structure in which the deep learning model 20 illustrated in FIG. 4 is repeated. To be more specific, the deep learning model 30 may be configured by a first neural network 31 and a second neural network 33 having a structure corresponding to the first neural network 31. The first neural network 31 may be configured by a first encoder (see an Encoder Module) which performs a first down-sampling process on the input image and a first decoder (see a Decoder Module) which performs a first up-sampling process on a feature map extracted from the first down-sampling process. The second neural network 33 may be configured by a second encoder (see an Encoder Module) which performs a second down-sampling process on the feature map output from the first decoder and a second decoder (see a Decoder Module) which performs a second up-sampling process on a feature map extracted from the second down-sampling process. For an explanation of neural networks 31 and 33, refer to the above-described example. The example deep learning model 30 repeatedly performs the down-sampling process and the up-sampling process to ensure a high segmentation accuracy. The deep learning model 30 illustrated in FIG. 5 will be described in more detail further with reference to known technical data regarding "W-Net."

The deep learning model may be constructed by learning (training) a training image set with given correct answer label information (for example, a segmentation map representing pixel level-class information) (for example, supervised learning) and in some cases, a training image set without the correct answer label information may be further utilized (for example, semi-supervised learning). Here, the correct answer label information may include label information about a segmentation target class and the segmentation target class may include a blood vessel. Those skilled in the art may be fully familiar with the learning method (for example, an error backpropagation technique) of the deep learning model so that the detailed description for the learning method may be omitted.

For reference, the training image set may be prepared by public DBs, such as DRIVE, STARE, CHASE, or HRF. The example DBs provide various training images about an eye fundus image so that if the example public DBs are utilized, costs for the training image set (for example, labeling or annotation costs) may be significantly saved.

In some example embodiments, a deep learning model which performs the semantic segmentation (that is, blood vessel region segmentation) on the colonoscopy image may be constructed by utilizing the example public DB and the semi-supervised learning technique. To be more specific, as illustrated in FIG. 6, the deep learning model 40 may be primarily trained using a first training image set 41 (that is, a plurality of eye fundus images with correct answer label information) which is prepared by the example public DB. Next, the deep learning model 40 may be additionally trained using the second training image set 43 including a plurality of colonoscopy images without the correct answer label information. Such additional learning may be performed by various semi-supervised learning techniques. For example, the additional learning may be performed by generating pseudo label information about the second training image set 43 through the deep learning model 40 and training the deep learning model 40 using the generated pseudo label information. However, the scope of the present disclosure is not limited thereto. According to the example embodiment, the deep learning model 40 is additionally trained by utilizing the plurality of colonoscopy images without correct answer label information to fine-tune the deep learning model 40 to more satisfactorily perform the blood vessel segmentation on the colonoscopy image. Further, the labeling (or annotation) cost for the colonoscopy image may be significantly reduced.

The example embodiment will be described with reference to FIG. 2 again.

In step S300, a distance between bifurcation points may be measured in the extracted blood vessel region. For example, the diagnosis apparatus 10 may detect the blood vessel bifurcation point from the extracted blood vessel region and measure a distance between the detected blood vessel bifurcation points. The reason for measuring the bifurcation distance is as follows. The blood vessel bifurcation point is one of feature points which may be accurately and easily detected by means of the image processing so that the bifurcation distance may be measured from the given medical image more accurately than sizes of the other entity (for example, lesion). Accordingly, when the size of the other entity (for example, lesion) is measured using the bifurcation distance as a reference length, the size of the entity may be accurately measured.

In some cases, the diagnosis apparatus 10 may perform appropriate image processing on the extracted blood vessel region image before detecting the blood vessel bifurcation point. For example, as illustrated in FIG. 7, the diagnosis apparatus 10 may perform the thresholding operation (see an image 53) and a morphology operation (see an image 54) on the blood vessel region image 52 extracted from the medical image 51. The thresholding operation may be a global thresholding operation which applies the same threshold to the entire regions but is not limited thereto. Further, the morphology operation may perform an erosion operation and a dilatation operation in this order or reverse order but is not limited thereto. When the image processing as illustrated above is performed, an effect of removing various noises (for example, a noise due to the illumination) included in the blood vessel region image may be achieved and as a result, the bifurcation distance may be more accurately measured.

In the meantime, in step S300, there are various methods to determine a bifurcation point to measure the bifurcation distance and this may vary depending on the example embodiments.

In some example embodiments, the diagnosis apparatus 10 may detect a dense region 56 from the blood vessel region image 54 based on the blood vessel density, as illustrated in FIG. 8. The diagnosis apparatus 10 may measure a distance between the blood vessel bifurcation points included in the dense region 56. For example, the diagnosis apparatus 10 may measure a distance between two blood vessel bifurcation points (for example, blood vessel bifurcation points at a leftmost side and a rightmost side) located to be closest to the outline of the dense region 56 but is not limited thereto. Further, the diagnosis apparatus 10 may calculate a bifurcation distance (an actual distance) using a pixel distance (that is, a distance on the image) between two blood vessel bifurcation points and a magnification of the image, but the scope of the present disclosure is not limited thereto. Therefore, the bifurcation distance may be measured (calculated) using any other method. For reference, it may be understood that the reason for detecting the dense region 56 is that there is a high possibility that a main blood vessel (for example, a thick blood vessel) is located in an area in which the blood vessels are dense.

In some example embodiments, the diagnosis apparatus 10 may detect the main blood vessel from the blood vessel region image (for example, 54) based on the thickness of the blood vessel and measure the distance between two bifurcation points (for example, the blood vessel bifurcation points at the leftmost side and the rightmost side) formed in the main blood vessel. For example, the diagnosis apparatus 10 may detect a blood vessel having the largest thickness or a thickness which is equal to or larger than a reference value, as the main blood vessel.

Further, in some example embodiments, the bifurcation points may be determined based on a combination of above-described example embodiments. For example, the diagnosis apparatus 10 may detect the main blood vessel from the dense region based on the blood vessel thickness and measure a distance between two bifurcation points (for example, left and right bifurcation points closest to the outline of the dense region) formed in the detected main blood vessel.

The example embodiment will be described with reference to FIG. 2 again.

In step S400, a size of the lesion may be predicted with respect to the measured distance. For example, the diagnosis apparatus 10 may predict an actual size of the lesion based on a relative size (that is, a size ratio on the image) of a region including the blood vessel bifurcation point and the lesion region on the image. As a more specific example, when the length of the lesion is twice the bifurcation distance on the image and a measured value of the bifurcation distance is "2 mm," the diagnosis apparatus 10 may predict the length of the lesion as "4 mm."

In the meantime, in some example embodiments of the present disclosure, the diagnosis apparatus 10 may provide various diagnosis information based on the predicted size of the lesion. For example, the diagnosis apparatus 10 may provide information about a disease regarding the lesion, a prognosis of the disease, a treatment method, and the like.

The lesion diagnosis method according to some example embodiments of the preset disclosure has been described so far with reference to FIGS. 2 to 8. According to the above-described method, a size of the lesion may be automatically predicted from the medical image of the subject without intervention of human. Accordingly, objective and highly reliable lesion information may be provided. For example, the size of the polyp is automatically predicted from the colonoscopy image to provide objective and highly reliable polyp information. Further, the size of the lesion is predicted based on the bifurcation distance of the blood vessel to improve a prediction accuracy for the lesion size.

In the meantime, when the medical image is distorted due to the distance between the camera and the lesion and an angle of the camera with respect to the lesion, the prediction accuracy for the lesion size may be degraded. Hereinafter, a method for solving this problem will be described with reference to FIG. 9. However, for clarity of the present disclosure, a description of content that overlaps with the previous embodiments will be omitted.

FIG. 9 is an example view for explaining a lesion diagnosis method considering image distortion, according to some example embodiments of the present disclosure.

As illustrated in FIG. 9, the lesion diagnosis method according to the present example embodiment may predict the size of the lesion using a plurality of medical images 60 and 70.

A first medical image 60 includes a blood vessel region 61 to be extracted and may be used to measure a bifurcation distance. For example, the diagnosis apparatus 10 may extract a blood vessel region 61 from the first medical image 60 and measure a distance D between two bifurcation points 62 and 63 located in the extracted blood vessel region 61.

The first medical image 60 may be an image which satisfies a predetermined capturing condition (or an image with less distortion). Here, the predetermined capturing condition may include a condition that a target blood vessel is located within a predetermined distance from the camera (for example, a close-up image of the target blood vessel), a condition that the target blood vessel is located within a predetermined range from a center of a viewing angle of the camera (for example, an image obtained by capturing the target blood vessel from the front), or the like. For example, the first medical image 60 may be a close-up image of a blood vessel region 61 adjacent to the polyp using the endoscopic camera, an image obtained by capturing a blood vessel region 61 adjacent to the polyp using the endoscopic camera from the front, and the like. In this case, the distortion of the blood vessel region 61 is minimized so that the distance D between two blood vessel bifurcation points 62 and 63 may be accurately measured.

Next, the second medical image 70 includes both the blood vessel region 61 and the lesion region 71 and may be used to measure a size (for example, a length L) of the lesion. For example, the diagnosis apparatus 10 may predict the size (L) of the lesion based on the relative size (for example, a ratio of a pixel distance between two bifurcation points 62 and 63 and a pixel length of the lesion) of the blood vessel region 61 and the lesion region 71 on the second medical image 70.

In this case, even though there is a distortion on the second medical image 70, the size L of the lesion may be accurately predicted. This is because even though there is a distortion, the relative size of the blood vessel region 61 and the lesion region 71 accurately reflects an actual size ratio of two entities (that is, a blood vessel and a lesion) and the bifurcation distance D is accurately measured using the medical image 60 with less distortion.

The lesion diagnosis method according to some example embodiments of the present disclosure which considers the image distortion has been described so far with reference to FIG. 9. According to the above-described method, the bifurcation distance is accurately measured using the medical image (for example, 60) with less distortion to more accurately predict the size of the lesion. For example, even though there is a distortion in the image (for example, 70) obtained by capturing the lesion, the size of the lesion may be accurately predicted.

Hereinafter, a comparison experiment result for performances of a lesion size prediction (measurement) method according to the example embodiment and a lesion size prediction (measurement) method of the related art will be briefly introduced.

Inventors of the present disclosure conducted an experiment of building a W-net-based deep learning model according to the learning method illustrated in FIG. 6 and predicting a size of a polyp in a colonoscopy image using the built deep learning model as illustrated in FIG. 2. Further, in order to compare the performances, an experiment was conducted between a group of experienced experts and a group of trainees to predict the size of polyps using visual observation and biopsy forceps methods. As a performance metric, a prediction error (that is, a difference between an actual value and a prediction value) and a concordance correlation coefficient of Lawrence Lin were used. For reference, the concordance correlation coefficient is an indicator indicating an error about a measurement agreement (reliability) and a value which is equal to or larger than 0.99 means that the measurement agreement is very good and a value which is equal to or smaller than 0.90 means that the measurement agreement is poor, and a value therebetween means that the measurement agreement is generally good.

Figure 11:
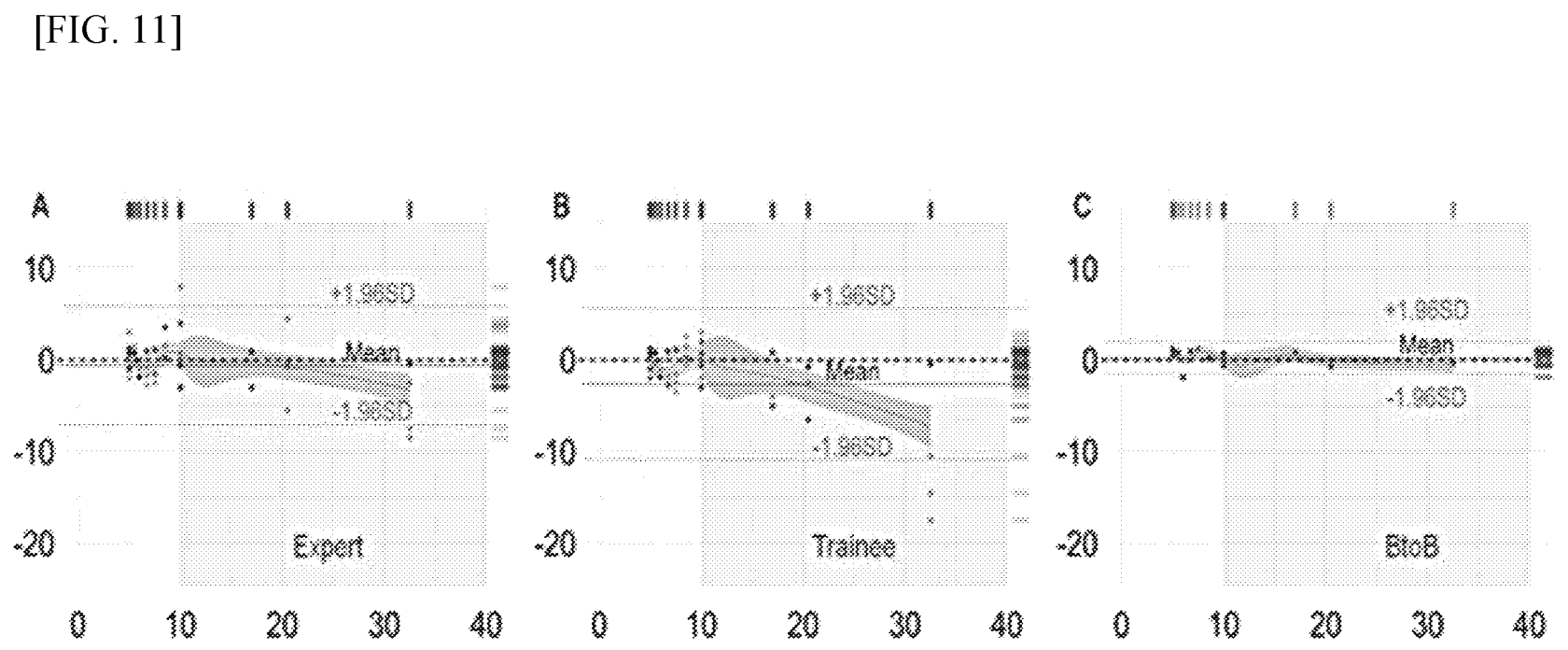

The comparison experiment result based on the prediction error is illustrated in FIGS. 10 and 11. FIG. 10 illustrates prediction errors of the visual observation method on a Bland-Altman plot and FIG. 11 illustrates prediction errors of a biopsy forceps method and a method according to the example embodiments on the Bland-Altman plot. In FIGS. 10 and 11, an x-axis indicates a size of a polyp sample, and a y-axis indicates a prediction error. In FIG. 11, the method according to the example embodiment is abbreviated by "BtoB."

Referring to FIGS. 10 and 11, it is confirmed that the method according to the example embodiment has a prediction error which is much smaller than those of the visual observation method and the biopsy forceps method. Specifically, it is confirmed that in the visual observation method, the prediction error is significantly large, and the biopsy forceps method is better than the visual observation method, but the prediction error is not small. Further, according to both methods, it is confirmed that the larger the size of the polyp sample, the larger the prediction error and the size of the polyp tends to be predicted to be smaller than the actual size. It is further confirmed that the prediction error significantly varies depending on the person. In contrast, according to the method of the example embodiment, it is confirmed that the prediction error is very small and even though the size of the polyp sample is increased, the prediction error is hardly increased and there is no tendency of predicting the size of the polyp to be smaller than the actual size.

Next, the comparison experiment result based on the concordance correlation coefficient is described in the following Table 1. In the following table, the method according to the example embodiment is abbreviated by "BtoB."

TABLE 1

| Classification | | Concordance correlation coefficient |
|---|---|---|
| Visual observation | Expert A | 0.815 |
| | Expert B | 0.721 |
| | Expert C | 0.699 |
| | Trainee D | 0.639 |
| | Trainee E | 0.378 |
| | Trainee F | 0.601 |
| Biopsy forceps | Expert A | 0.859 |
| | Trainee B | 0.718 |
| BtoB | | 0.933 |

Referring to Table 1, it is understood that in the method according to the example embodiment, the concordance correlation coefficient is 0.99 or larger so that the measurement agreement is very good. In contrast, in the visual observation method and the biopsy forceps method, the concordance correlation coefficient is 0.9 or lower so that it is understood that the measurement agreement is very bad.

The comparison experiment results for the performances of the method according to the example embodiment and the method of the related art (the visual observation method and the biopsy forceps method) have been briefly introduced so far. According to the above-described comparison experiment results, it is understood that the prediction accuracy and the reliability of the method according to the example embodiment are much more excellent than those of the related art method.

Hereinafter, an example computing device 100 which implements the diagnosis apparatus 10 according to some example embodiments of the present disclosure will be described.

FIG. 12 is an example hardware diagram illustrating a computing device 100.

As illustrated in FIG. 12, the computing device 100 includes one or more processors 110, a bus 130, a communication interface 140, a memory 120 in which a computer program to be executed by the processor 110 is loaded, and a storage 150 which stores the computer program 160. However, in FIG. 12, only components related to the example embodiment of the present disclosure are illustrated. Accordingly, those skilled in the art to which this disclosure pertains may understand that general-purpose components may be included other than the components illustrated in FIG. 12. That is, the computing device 100 may further include various components, as well as the components illustrated in FIG. 12. Further, in some cases, some of the components illustrated in FIG. 12 may be omitted to configure the computing device 100. Hereinafter, the respective components of the computing device 100 will be described.

The processor 110 controls the overall operation of each configuration of the computing device 100. The processor 110 may be configured to include at least one of a central processing unit (CPU), a microprocessor unit (MPU), a micro controller unit (MCU), a graphic processing unit (GPU), or an arbitrary processor which is well known in the technical field of the present disclosure. Further, the processor 110 may perform an arithmetic operation for at least one application or program to execute the operation/method according to the example embodiments of the present disclosure. The computing device 100 may include one or more processors.

Next, the memory 120 stores various data, instructions and/or information. The memory 120 may load one or more programs 160 from the storage 150 to execute the operation/method according to the example embodiments of the present disclosure. The memory 120 may be implemented by a volatile memory, such as RAM, but the technical scope of the present disclosure is not limited thereto.

Next, the bus 130 provides a communication function between components of the computing device 100. The bus 130 may be implemented by various types of buses, such as an address bus, a data bus, and a control bus.

Next, the communication interface 140 supports the wired/wireless Internet communication of the computing device 100. Further, the communication interface 140 may support various communication methods other than the Internet communication. To this end, the communication interface 140 may include a communication module which is well-known in the technical field of the present disclosure. In some cases, the communication interface 140 may be omitted.

Next, the storage 150 may non-temporarily store one or more computer programs 160. The storage 150 may be configured by including a nonvolatile memory such as a read only memory (ROM), an erasable programmable ROM (EPROM), an electrically erasable programmable ROM (EEPROM), and a flash memory, a hard disk, a removable disk, or any computer readable recording medium which is well known in the technical field of the present disclosure.

Next, the computer program 160 may include one or more instructions to allow the processor 110 to perform operations/methods according to various example embodiments of the present disclosure when it is loaded in the memory 120. That is, the processor 110 executes one or more instructions to perform the operations/methods according to various example embodiments of the present disclosure.

For example, the computer program 160 may include instructions to perform an operation of acquiring a medical image of a subject, an operation of extracting a blood vessel region from the acquired medical image, an operation of measuring a distance between blood vessel bifurcation points in the extracted blood vessel region, and an operation of predicting a size of a lesion based on the measured distance. As described above, the diagnosis apparatus 10 according to some example embodiments of the present disclosure may be implemented by the computing device 100.

The technical spirit of the present disclosure which has been described so far with reference to FIGS. 1 to 12 may be implemented as a compute readable code on a computer readable medium. The computer readable recording medium may be a removable recording medium (CD, DVD, Blu-ray disk, USB storage device, mobile hard disk) or a non-removable recording medium (ROM, RAM, computer equipped hard disk). The computer program recorded in the computer readable recording medium is transmitted to another computing device through a network, such as the Internet, installed in the other computing device, and thus used in the other computing device.

Even though all components of the example embodiment of the present disclosure may be combined as one component or operate to be combined, the technical spirit of the present disclosure is not limited to the example embodiment. In other words, one or more components may be selectively combined to be operated within the scope of the present disclosure.

Although operations are illustrated in the drawings in a specific order, it should not be understood that the operations must be performed in the illustrated specific order or sequential order or that all illustrated operations must be performed to obtain the desired results. In a specific circumstance, multi-tasking and parallel processing may be advantageous. Moreover, in the example embodiments described above, the separation of the various components should not be construed as requiring such separation, and it should be understood that the program components and systems described generally may be integrated together into a single software product or packaged into a plurality of software products.

The example embodiments of the present disclosure have been described with reference to the accompanying drawings, but those skilled in the art will understand that the present disclosure may be implemented in another specific form without changing the technical spirit or an essential feature thereof. Thus, it is to be appreciated that the embodiments described above are intended to be illustrative in every sense, and not restrictive. The protection scope of the present disclosure should be interpreted based on the following appended claims and it should be appreciated that all technical spirits included within a range equivalent thereto are included in the protection scope of the technical spirit defined by the present disclosure.

The invention claimed is:

1. An apparatus for lesion diagnosis, the apparatus comprising:
- a processor; and
- a memory configured to store one or more instructions,
- wherein the processor configured to, by executing the one or more stored instructions, perform:
- acquiring a medical image of a subject;
- extracting a blood vessel region from the acquired medical image;
- measuring a distance between blood vessel bifurcation points in the extracted blood vessel region; and
- predicting a size of a lesion based on the measured distance,
- wherein the medical image comprises a first image including the blood vessel region and a second image including both the blood vessel region and the lesion region,
- the extracting a blood vessel region comprises:
- extracting the blood vessel region from the first image, and
- the predicting a size of the lesion comprises:
- predicting the size of the lesion based on a relative size of a region including the blood vessel bifurcation points and the lesion region on the second image.

2. The apparatus of claim 1, wherein the extracting a blood vessel region comprises extracting the blood vessel region using a deep learning model configured to perform semantic segmentation.

3. The apparatus of claim 2, wherein the deep learning model comprises an encoder configured to perform a down-sampling process on the input image and a decoder configure to perform an up-sampling process on a feature map extracted during the down-sampling process.

4. The apparatus of claim 2, wherein the deep learning model comprises a first neural network and a second neural network having a structure corresponding to the first neural network,
- the first neural network comprises a first encoder configured to perform a first down-sampling process on the input image and a first decoder configured to perform a first up-sampling process on a feature map extracted during the first down-sampling process, and the second neural network comprises a second encoder configured to perform a second down-sampling process on a feature map output from the first decoder and a second decoder configured to perform a second up-sampling process on a feature map extracted during the second down-sampling process.

5. The apparatus of claim 2, wherein the medical image is a colonoscopy image, the deep learning model is trained using a first training image set with correct answer label information and a second training image set without the correct answer label information, the first training image set comprises a plurality of eye fundus images, and the second training image set comprises a plurality of colonoscopy images.

6. The apparatus of claim 1, wherein the extracted blood vessel region is a blood vessel region located inside the lesion or to be adjacent to the lesion.

7. The apparatus of claim 1, wherein the measuring a distance between the blood vessel bifurcation points comprises:

performing image processing comprising a thresholding operation and a morphology operation on the extracted blood vessel region; and measuring a distance between the blood vessel bifurcation points in the blood vessel region in which the image processing is performed.

8. The apparatus of claim 1, wherein the measuring a distance between the blood vessel bifurcation points comprises:

detecting a dense region from the extracted blood vessel region based on a density of the blood vessel; and measuring the distance between the blood vessel bifurcation points located in the dense region.

9. The apparatus of claim 1, wherein the measuring a distance between the blood vessel bifurcation points comprises:

detecting a main blood vessel from the extracted blood vessel region based on a thickness of the blood vessel; and measuring the distance between the bifurcation points formed in the main blood vessel.

10. The apparatus of claim 1, wherein the first image is an image which satisfies a predetermined capturing condition, and the predetermined capturing condition comprises a condition that the blood vessel is located within a predetermined distance from a camera or a condition that the blood vessel is located in a predetermined range from a center of a viewing angle of the camera.

11. The apparatus of claim 1, wherein the medical image is a colonoscopy image, and the lesion is a polyp.

12. A method for lesion diagnosis performed by a computing device, the method comprising:

acquiring a first medical image of a subject including a blood vessel region;

extracting the blood vessel region from the first medical image;

measuring a distance between blood vessel bifurcation points in the extracted blood vessel region, acquiring a second medical image including both the blood vessel region and a lesion region; and predicting a size of the lesion based on a relative size relationship between (i) a region including the blood vessel bifurcation points and (ii) the lesion region in the second medical image.

* * * * *